Aug. 29, 1939.    A. ROSCH    2,171,346

POWER PLANT

Filed May 27, 1938

Inventor:
Arthur Rosch,
by Harry E. Dunham
His Attorney.

Patented Aug. 29, 1939

2,171,346

UNITED STATES PATENT OFFICE 2,171,346

POWER PLANT

Arthur Rosch, Brieselang, near Nauen, Osthavelland, Germany, assignor to General Electric Company, a corporation of New York Application May 27, 1938, Serial No. 210,523
In Germany August 27, 1937

2 Claims. (Cl. 290—4)

The present invention relates to power plants, more particularly to power plant arrangements in which an auxiliary generator for supplying electric energy to power plant auxiliaries is normally driven by a main prime mover and on failure of the latter by an auxiliary motor or prime mover.

The object of my invention is to provide an improved power plant arrangement whereby the auxiliary generator normally driven by a prime mover upon failure of the latter is automatically driven by an auxiliary prime mover.

For a consideration of what I believe to be novel and my invention, attention is directed to the following description and the claims appended thereto in connection with the accompanying drawing.

Figure 1:
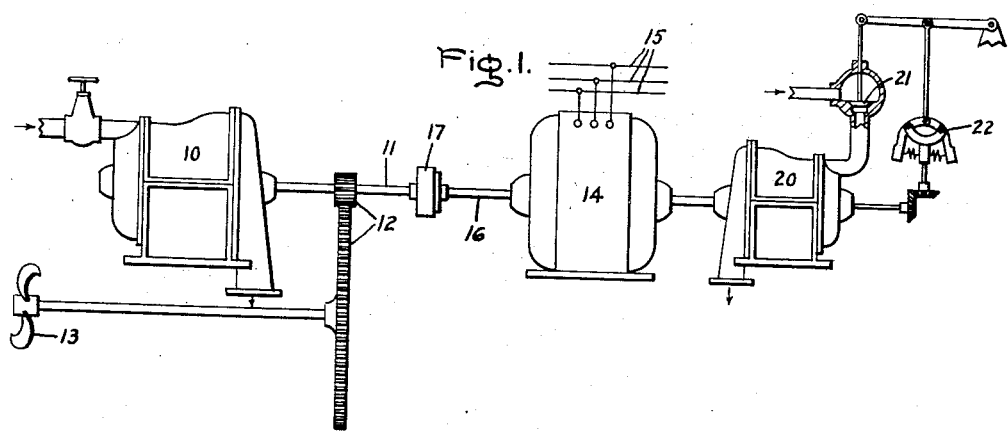
Figure 2:
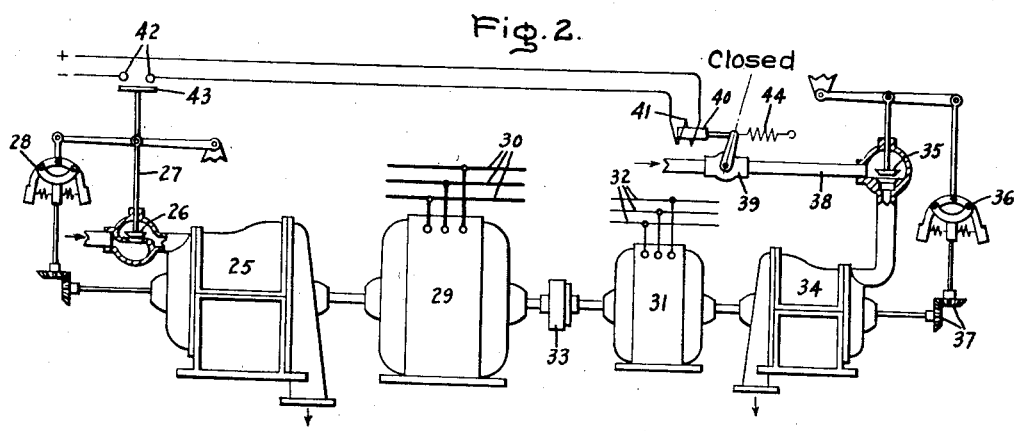
Figure 3:
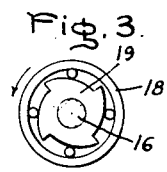

In the drawing, Fig. 1 illustrates a power plant arrangement embodying my invention; Fig. 2 is a modification of my invention; and Fig. 3 shows a detail view of parts of Figs. 1 and 2.

The arrangement of Fig. 1 comprises a main prime mover 10 having a shaft 11 connected by a reducing gearing 12 to a propeller 13. The plant includes an auxiliary generator 14 for supplying energy to a line 15. The auxiliary generator 14 has a shaft 16 which in accordance with my invention is coupled to the shaft 11 by means of a free-wheeling coupling 17. The latter, as shown in Fig. 3, has an element 18 secured to the shaft 11 and another element 19 secured to the shaft 16. As long as the coupling element 19 is rotated above a certain speed, the free-wheeling coupling connects the shafts 11 and 16. If, however, the speed of the element 18 drops below a certain value or, from another viewpoint, as soon as the speed difference between the shafts 11 and 16 reaches a certain value, the free-wheeling coupling disconnects the two shafts. The auxiliary generator 14 then is driven by an auxiliary prime mover, in the present instance an elastic fluid turbine 20. The latter has an inlet valve 21 and a governing mechanism including a speed governor 22 driven grom the shaft of the auxiliary turbine 20 for controlling the inlet valve 21 in response to speed changes upon failure of the main turbine 10. The valve 21 of the auxiliary turbine is normally closed, that is, the speed governor 22 is set to open the turbine valve 21 at a speed below the normal operating speed of the main turbine 10.

The arrangement of Fig. 2 comprises a main prime mover, such as an elastic fluid turbine 25, which has an inlet valve 26 with a stem 27 connected to a governing mechanism including a speed governor 28 driven from the main turbine shaft. The main turbine 25 in the present instance is arranged to drive a main generator 29 for supplying electric energy to a main line 30. An auxiliary generator 31 for supplying energy to auxiliaries (not shown) through an auxiliary or house line 32 has a shaft coupled with that of the main turbo generator 25, 29 by means of a free-wheeling coupling 33. The arrangement of the latter may be similar to that shown in Fig. 3 and described in connection with Fig. 1. Upon failure of the main prime mover 25 the coupling 33 disengages, whereupon the auxiliary generator 31 is driven by means of an auxiliary elastic fluid turbine 34. The latter has an inlet valve 35 operated or controlled by a governing mechanism including a speed governor 36 driven through a gearing 37 from the shaft of the auxiliary turbine 34. Elastic fluid is supplied to the inlet valve 35 through a conduit 38 which includes a valve 39 normally held in closed position. The valve 39 is automatically opened upon failure of the main turbine 25. To this end the valve is connected to a solenoid having a core 40 and an energizing coil 41. The electric circuit for the coil 41 includes contacts 42 in cooperative relation with a contact-making member 43 secured to an extension of the valve stem 27. When the speed of the main turbine 25 drops to a certain low value or when the inlet valve 26 of the main turbine is moved towards full opening position, the contact-making member 43 bridges the contacts 42 whereby the energizing coil 41 is connected to a source of energy and the valve 39 forced into full opening position against the biasing force of the spring 44. If thereafter the speed of the main turbine 25 increases again, the contact-making member 43 is moved away from the contact 42, thus interruping the circuit of the energizing coil 41 and permitting the valve 39 to be moved into closing position by a spring 44, thus disconnecting the auxiliary turbine 34. Simultaneously the coupling 33 engages to drive the auxiliary generator from the main turbine. In this arrangement the valve 35 of the auxiliary turbine is normally open and the speed governor 36 for the auxiliary turbine is preferably set for the same speed as the speed governor 28 for the main turbine.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Power plant comprising a main prime mover, an auxiliary generator for supplying electric energy to auxiliaries, means for normally driving the auxiliary generator from the main prime mover including a free-wheeling coupling connecting the auxiliary generator shaft to the main prime mover shaft, and means for driving the auxiliary generator upon failure of the main generator, said last named means including an elastic fluid engine coupled to the auxiliary generator and a speed governing mechanism for controlling the engine, said mechanism including a speed governor driven from the engine shaft and set for a speed below the normal operating speed of the main prime mover.

2. Power plant comprising a prime mover having a control valve, a speed governing mechanism driven from the main prime mover for controlling the control valve, an auxiliary generator, means including a free-wheeling coupling for normally driving the auxiliary generator by the main prime mover, and means for driving the auxiliary generator if the main prime mover speed drops below a certain value, said last named means including an elastic fluid turbine mechanically connected to the auxiliary generator, an inlet valve for the auxiliary turbine, a governing mechanism including a speed governor driven from the auxiliary turbine shaft and set for a speed substantially equal to the speed setting of the speed governor for the main prime mover, a conduit including a normally closed valve for supplying elastic fluid to the inlet valve, and means to automatically open the conduit valve as the speed of the main prime mover drops below a certain value and thereafter closing the conduit valve if the speed of the prime mover rises again above such certain value.

ARTHUR ROSCH.